United States Patent
Kobayashi et al.

(10) Patent No.: US 10,268,284 B2
(45) Date of Patent: Apr. 23, 2019

(54) IMAGE DISPLAY SYSTEM

(71) Applicant: MAXELL, LTD., Otokuni-gun, Kyoto (JP)

(72) Inventors: Shuhei Kobayashi, Kyoto (JP); Shinji Onodera, Kyoto (JP)

(73) Assignee: Maxell, Ltd., Kyoto (JP)

(*) Notice: Subject to any disclaimer, the term of this patent is extended or adjusted under 35 U.S.C. 154(b) by 0 days.

(21) Appl. No.: 15/747,772

(22) PCT Filed: Jul. 29, 2015

(86) PCT No.: PCT/JP2015/071532
§ 371 (c)(1),
(2) Date: Jan. 26, 2018

(87) PCT Pub. No.: WO2017/017812
PCT Pub. Date: Feb. 2, 2017

(65) Prior Publication Data
US 2018/0217683 A1 Aug. 2, 2018

(51) Int. Cl.
*G06F 3/0354* (2013.01)
*G06F 3/03* (2006.01)
(Continued)

(52) U.S. Cl.
CPC .......... *G06F 3/03542* (2013.01); *G06F 3/03* (2013.01); *G06F 3/0346* (2013.01); *G06F 3/041* (2013.01); *G06F 3/042* (2013.01); *G06F 3/04845* (2013.01)

(58) Field of Classification Search
CPC .... G06F 3/03545; G06F 3/0383; G06F 3/046; G06F 3/03; G06F 3/0346; G06F 3/03542; G06F 3/041; G06F 3/042; G06F 3/04845
(Continued)

(56) References Cited

U.S. PATENT DOCUMENTS

| 4,670,751 A * | 6/1987 | Enokido ................. G06F 3/038 178/19.01 |
| 6,100,538 A | 8/2000 | Ogawa |

(Continued)

FOREIGN PATENT DOCUMENTS

| JP | 11-003170 A | 1/1999 |
| JP | 2012-221115 A | 11/2012 |
| JP | 2013-235416 A | 11/2013 |

OTHER PUBLICATIONS

International Search Report of PCT/JP2015/071532 dated Oct. 27, 2015.

*Primary Examiner* — Nelson M Rosario
(74) *Attorney, Agent, or Firm* — Mattingly & Malur, PC

(57) ABSTRACT

In an image display system including a pen and a projection-type image display device having an interactive function, attributes such as a color and a thickness of a line or a figure to be drawn can be more flexibly switched at a lower cost. According to a typical embodiment, a pen-shaped pointing tool has a light emitting portion which emits non-visible light with a predetermined wavelength. The projection-type image display device has an interactive function unit which, from image data captured by a sensor performing image-capturing based on reflection light of the non-visible light with the predetermined wavelength reflected on the screen, recognizes a position of and a content of a light emitting pattern emitted from the pointing tool onto the screen, and executes process contents which are different from one another, based on the recognized position of and content of the light emitting pattern.

14 Claims, 8 Drawing Sheets

(51) Int. Cl.
    *G06F 3/041*         (2006.01)
    *G06F 3/042*         (2006.01)
    *G06F 3/0484*       (2013.01)
    *G06F 3/0346*       (2013.01)

(58) Field of Classification Search
    USPC ............ 345/156, 173, 176, 179; 178/19.02;
                     206/214; 850/1; 455/566; 401/195;
                     725/109
    See application file for complete search history.

(56) References Cited

U.S. PATENT DOCUMENTS

| | | | |
|---|---|---|---|
| 2010/0182284 A1* | 7/2010 | Tremblay | G06F 3/03545 |
| | | | 345/179 |
| 2013/0088465 A1* | 4/2013 | Geller | G06F 3/03545 |
| | | | 345/179 |
| 2013/0300658 A1 | 11/2013 | Endo et al. | |
| 2014/0300558 A1* | 10/2014 | Yamaguchi | G06F 3/0416 |
| | | | 345/173 |

\* cited by examiner

10 : SCREEN
20 : DISPLAY SCREEN
21 : IMAGE REGION
22 : OPERATION ICON REGION
23a,b : DRAWN FIGURE
30a,b : LIGHT EMITTING PEN
35a,b : LIGHT EMITTING PATTERN
100 : PROJECTION-TYPE IMAGE DISPLAY DEVICE
200 : IMAGE OUTPUT DEVICE
300 : INFORMATION PROCESSING DEVICE (a)

(b)

(c)

(a)

(b)

(c)

(a)

(b)

IMAGE DISPLAY SYSTEM

TECHNICAL FIELD

The present invention relates to a technique with reference to a projection-type image display device, and more particularly relates to a technique effectively applied to an image display system configured of a pen and a projection-type image display device which has an interactive function.

BACKGROUND ART

Some projection-type image display devices (which is referred to as "projector" below in some cases) which project images onto a screen or others have been put to practical use, each of the projection-type image display devices having an interactive function that allows a user to efficiently and effectively make a presentation. In this manner, the user draws letters, figures, etc., on a display screen or performs a switching operation of a displayed image by performing an operation of drawing, etc., on the display screen projected onto a screen by using a finger, a dedicated pen (which is, more precisely, a "pen-shaped pointing tool" but simply referred to as "pen" in some cases) and etc.

Various methods of detecting a position of the pen or others relative to the display screen are proposed. For example, there are a method of identifying the position by detecting reflected light from the pen or others after emission of laser light, etc., onto the screen or by detecting a light-blocked state, a method of detecting a position at which laser light, etc., is emitted onto the screen, and other methods.

When the user utilizes such an interactive function, the user desires to, for example, switch attributions such as color and thickness of a drawn line or figure at any time. Conventionally, when the switching is performed by using a single pen, a switching method has been adopted, the switching method using a pallet achieved on a software basis and projected on the screen and selecting a region indicating an attribute such as desired color and line thickness by using the pen. On the other hand, a method is also proposed, the method preparing a plurality of pens and separately using the pens to which the different attributes such as color and line thickness are assigned, respectively.

For example, Japanese Patent Application Laid-open Publication No. 2012-221115 (Patent Document 1) describes a technique of detecting input of coordinates by using a plurality of pointing tools. In this technique, the plurality of pointing tools store unique identification information for distinguishing them from each other, and create a transmission signal including identification information and switch information indicating states of a plurality of switching means at a repetition cycle that is set uniquely to the identification information. A coordinates input device receives the transmission signals from the pointing tools, identifies the repetition cycle of the transmission signal for the pointing tool corresponding to the identification information detected from the received signal based on the identification signal, and generates transmission-signal timing information synchronizing with the repetition cycle.

RELATED ART DOCUMENT

Patent Document

Patent Document 1: Japanese Patent Application Laid-open Publication No. 2012-221115

SUMMARY OF THE INVENTION

Problems to be Solved by the Invention

In a conventional technique, when the user switches the attributes such as color and thickness of a drawn line or figure at any time by using a single pen, there is no other method than the switching operation on software by usage of a pallet or others, and therefore, complicated operations and a certain operation time are required for the switching. Even in the method of separately using a plurality of pens, the pens to which the attributes such as color and thickness are assigned are separately used based on the unique identification information set for each pen as described in, for example, the Patent Document 1, and it is required to prepare pens corresponding to switching patterns, and therefore, the method has a lack of flexibility and large burden on a cost.

Accordingly, an object of the present invention is to allow an image display system configured of a pen and a projection-type image display device having an interactive function to more flexibly switch attributes such as a color and a thickness of a line or a figure to be drawn at a lower cost.

The above and other objects and novel characteristics of the present invention will be apparent from the description of the present specification and the accompanying drawings.

Means for Solving the Problems

The summary of the typical aspects of the inventions disclosed in the present application will be briefly described as follows.

An image display system according to a typical embodiment of the present invention is an image display system including a projection-type image display device which projects an image onto a screen and a pen-shaped pointing tool which is operated by a user. The pointing tool has a light emitting portion which emits non-visible light with a predetermined wavelength. The projection-type image display device has an interactive function unit which, from image data captured by a sensor performing image-capturing based on reflection light of the non-visible light with the predetermined wavelength reflected on the screen, recognizes a position of and a content of a light emitting pattern which is a shape of the non-visible light with the predetermined wavelength emitted from the pointing tool onto the screen, and executes process contents which are different from one another, based on the recognized position of and content of the light emitting pattern.

Effects of the Invention

The effects obtained by the typical aspects of the present invention disclosed in the present application will be briefly described as follows.

That is, according to the typical embodiment of the present invention, in an image display system configured of a pen and a projection-type image display device which has an interactive function, attributes such as color and thickness of a drawn line or figure can be more flexibly switched at a lower cost.

BRIEF DESCRIPTIONS OF THE DRAWINGS

Figure 3:
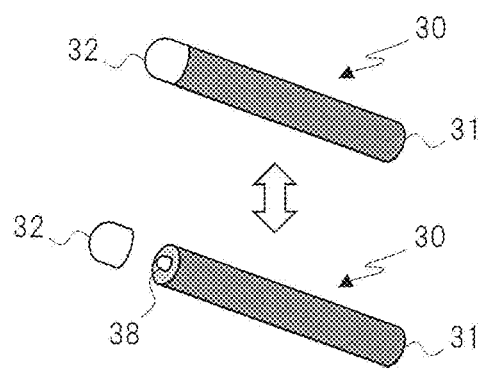
Figure 3:
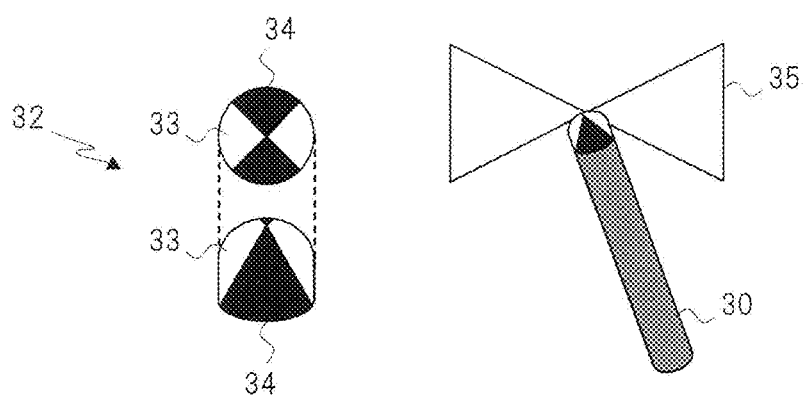
Figure 3:
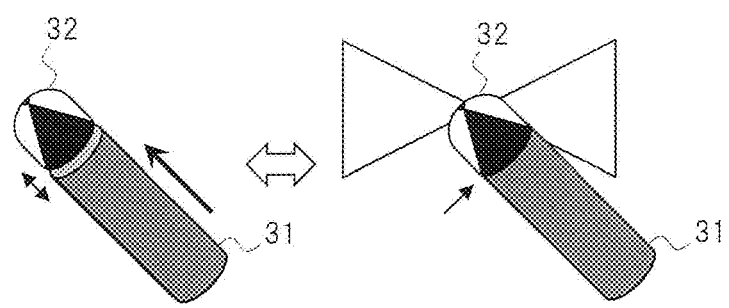
Figure 4:
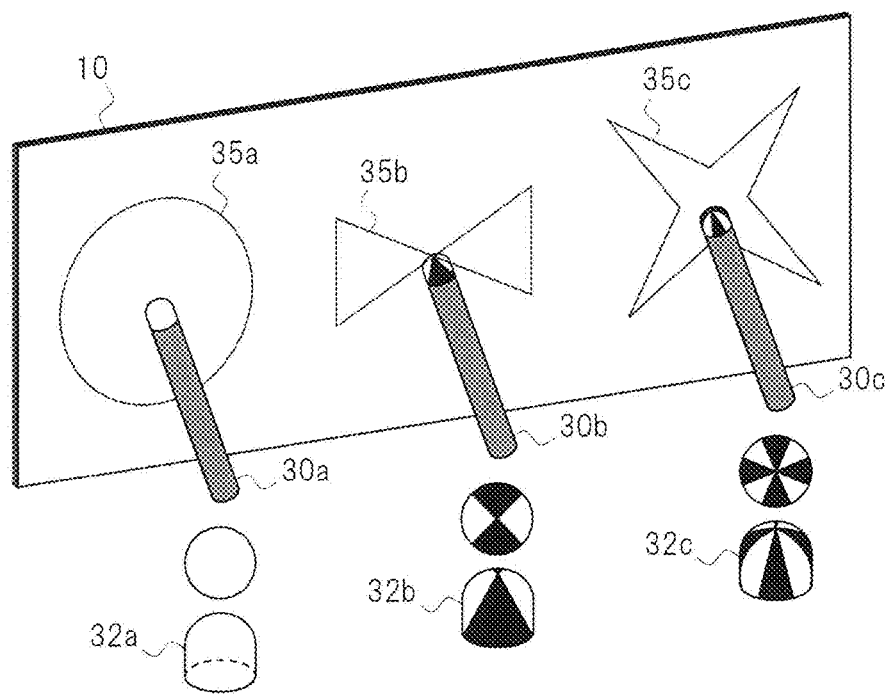
Figure 5:
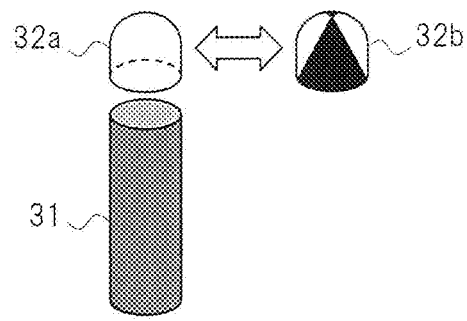
Figure 5:
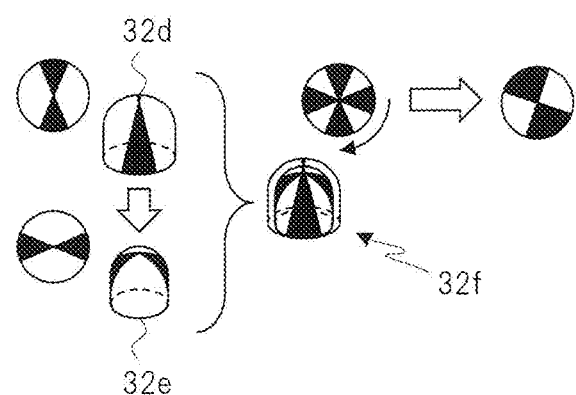
Figure 5:
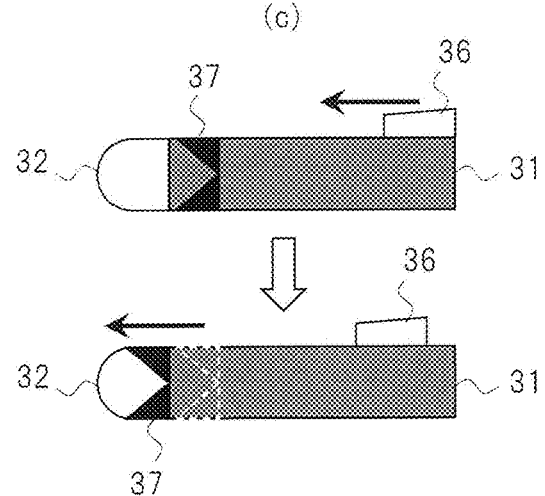
Figure 6:
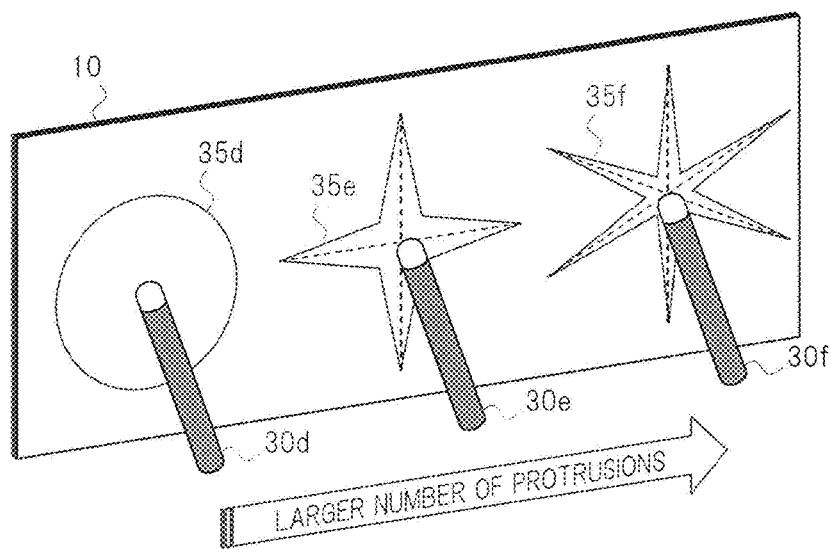
Figure 6:
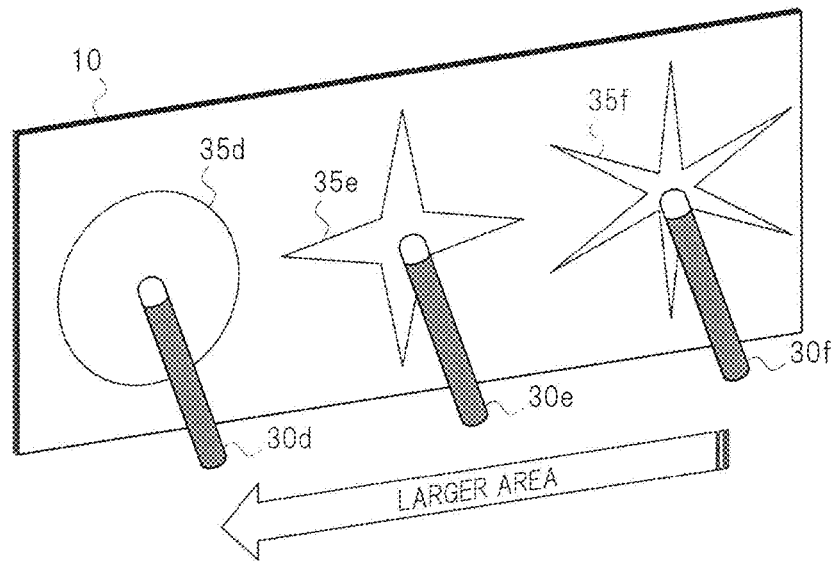
Figure 7:
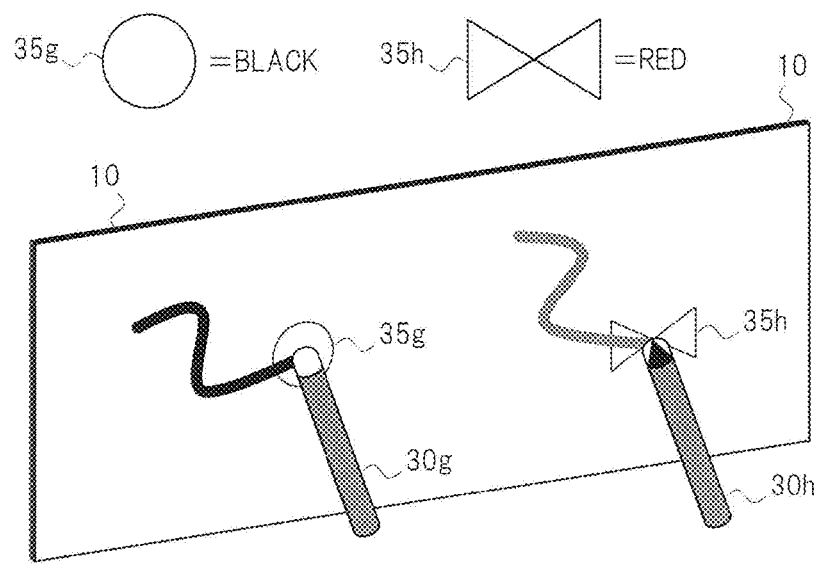
Figure 7:
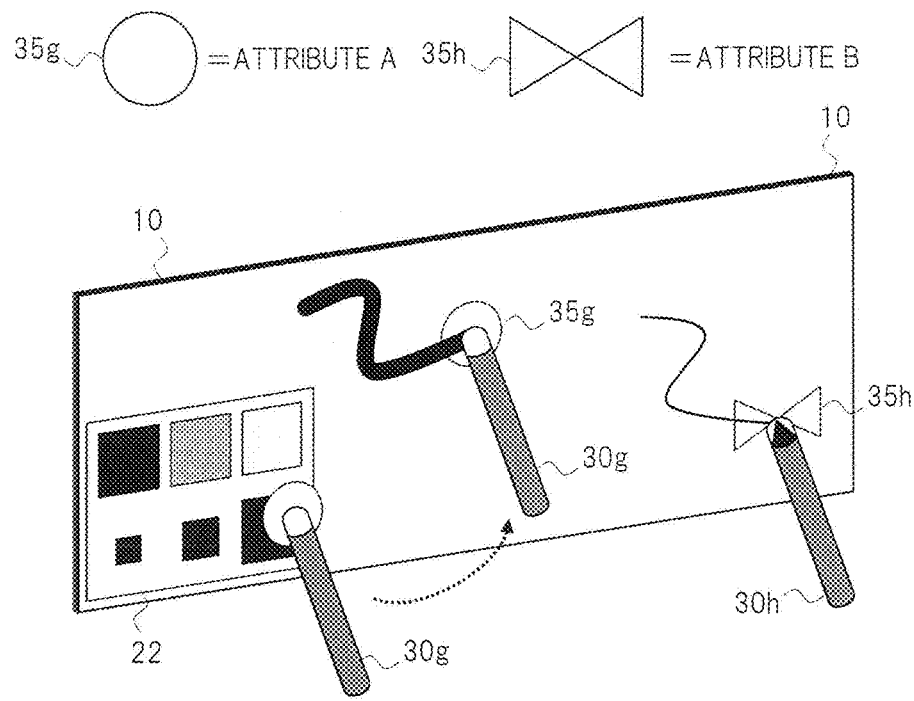
Figure 8:
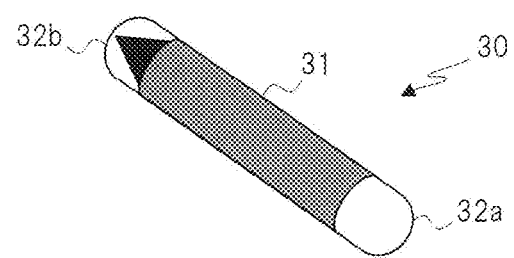
Figure 8:
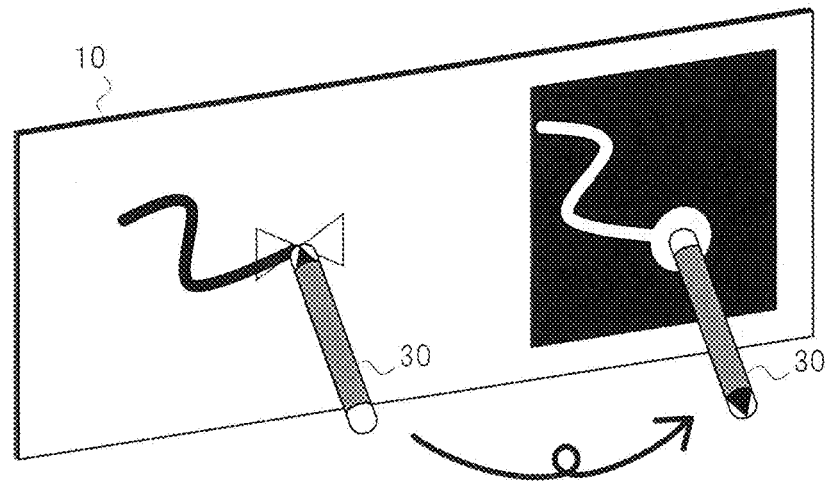

FIG. 3 (a) to FIG. 3(c) are diagrams each showing an outline of a configuration example of a light emitting pen according to the first embodiment of the present invention;

FIG. 4 is a diagram showing an outline of an example of difference in a light emitting pattern formed by a light emitting pen head according to the first embodiment of the present invention;

FIG. 5 (a) to FIG. 5(c) are diagrams each showing an outline of an example of a method of switching light blocking patterns of a light emitting pen head according to a second embodiment of the present invention;

FIG. 6 (a) and FIG. 6(b) are diagrams each showing an outline of an example of a method of identifying a light emitting pattern according to a third embodiment of the present invention;

FIG. 7 (a) and FIG. 7(b) are diagrams each showing an outline of an attribute setting example in line or figure drawing for a light emitting pattern according to a fourth embodiment of the present invention; and FIG. 8 (a) and FIG. 8(b) are diagrams each showing an outline of examples of a configuration of a light emitting pen and line or figure drawing according to a fifth embodiment of the present invention.

BEST MODE FOR CARRYING OUT THE INVENTION

Hereinafter, embodiments of the present invention will be described in detail based on the accompanying drawings. Note that the same components are denoted by the same reference symbols in principle throughout all the drawings for describing the embodiments, and the repetitive description thereof will be omitted. On the other hand, a portion explained with a reference symbol in a certain drawing is not illustrated again for explanation in other drawing, but is described with the same reference symbol in some cases.

First Embodiment

Figure 1:
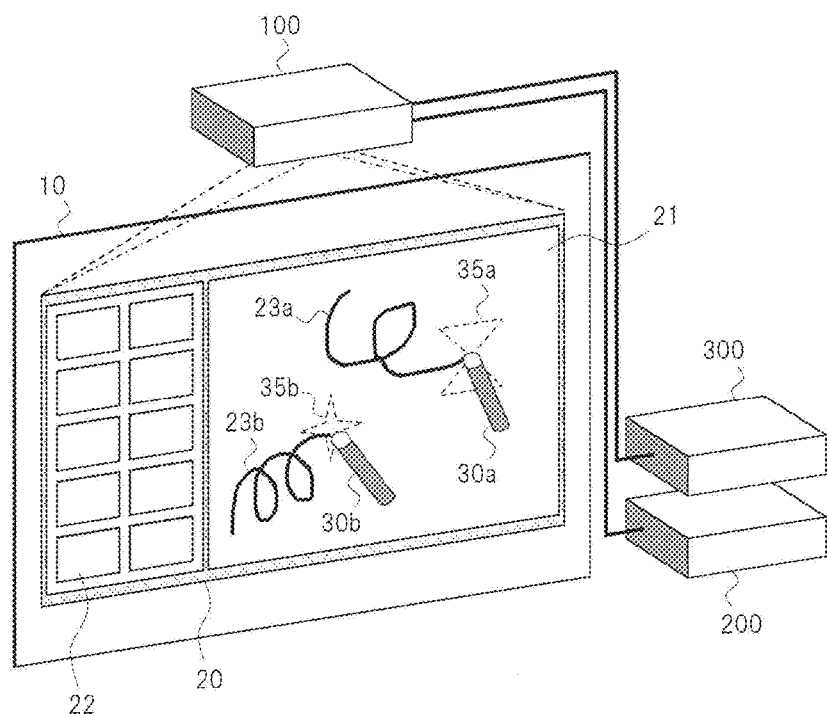
FIG. 1 is a diagram showing an outline of a configuration example of an image display system according to a first embodiment of the present invention.

FIG. 1 is a diagram showing an outline of a configuration example of an image display system according to a first embodiment of the present invention. The image display system is configured of a projection-type image display device (projector) 100 and one or more light emitting pens 30 (two light emitting pens 30a and 30b in the drawing). To the projection-type image display device 100, an image output device 200 and an information processing device 300 are connected via wired or wireless communication.

The projection-type image display device 100 displays an image by projecting the image onto a screen 10 which is a projection plane. A display screen 20 projected on the screen 10 has an image region 21 where an image is displayed, and besides, an operation icon region 22 where an operation icon group, etc., for executing an interactive function are displayed. The operation icons include, for example, a "mouse operation" icon, a "line drawing" icon that is a drawing function, an "eraser" icon, an icon for calling an operation menu of a main body of the projection-type image display device 100, and others. In addition, the operation icons may further include a function for switching a displayed content of an image of the projection-type image display device 100, a function for adjusting other operations (audio output or others) of the projection-type image display device 100, and others.

The example of FIG. 1 shows a state as the interactive function in which a user performs line drawing 23a or 23b by bringing the light emitting pen 30a or 30b which is a pointing tool in contact with the screen 10 on which the image region 21 is projected. In the present embodiment, note that the light emitting pens 30a and 30b are set so as to emit light with different light emitting patterns 35 (35a and 35b in the drawing) from each other. As it will be described later, the attributes such as color and thickness of a drawn line can be switched depending on such a light emitting pattern 35.

To the projection-type image display device 100, the image output device 200 outputs image data to be projected and displayed on the image region 21. As the image output device 200, for example, various information processing devices such as a PC (Personal Computer), a tablet terminal, and a portable terminal such as a smartphone, or various image apparatuses such as a DVD player can be used.

The image output device 200 may be a small image storage device such as USB memory that is directly connected to the projection-type image display device 100. Alternatively, the image output device 200 may be a streaming image receiving device that is directly connected to the projection-type image display device 100, that receives streaming data from a server, etc., on the Internet, and that outputs images to the projection-type image display device 100.

The information processing device 300 performs input/output of various control signals which include control signals related to the interactive function to/from the projection-type image display device 100. In this manner, the display operation of the projection-type image display device 100 can be controlled on the information processing device 300. As the information processing device 300, for example, a PC, a tablet terminal, or a portable terminal such as smartphone can be used.

Note that the example of FIG. 1 shows that the projection-type image display device 100 and the information processing device 300 are different devices from each other. However, the information processing device 300 may be collected into the projection-type image display device 100 as the same device. And, the information processing device 300 may have a function of the image output device 200. The projection-type image display device 100 may have a function of the image output device 200. Therefore, the functions of the image output device 200 and the information processing device 300 may be integrally collected into the projection-type image display device 100.

As described above, both of wired and wireless communications are applicable for the connection between the projection-type image display device 100 and the image output device 200/information processing device 300. However, when the image output device 200 or the information processing device 300 is a tablet terminal or a portable terminal such as smartphone, the connection via the wireless communication is particularly preferable.

Figure 2:
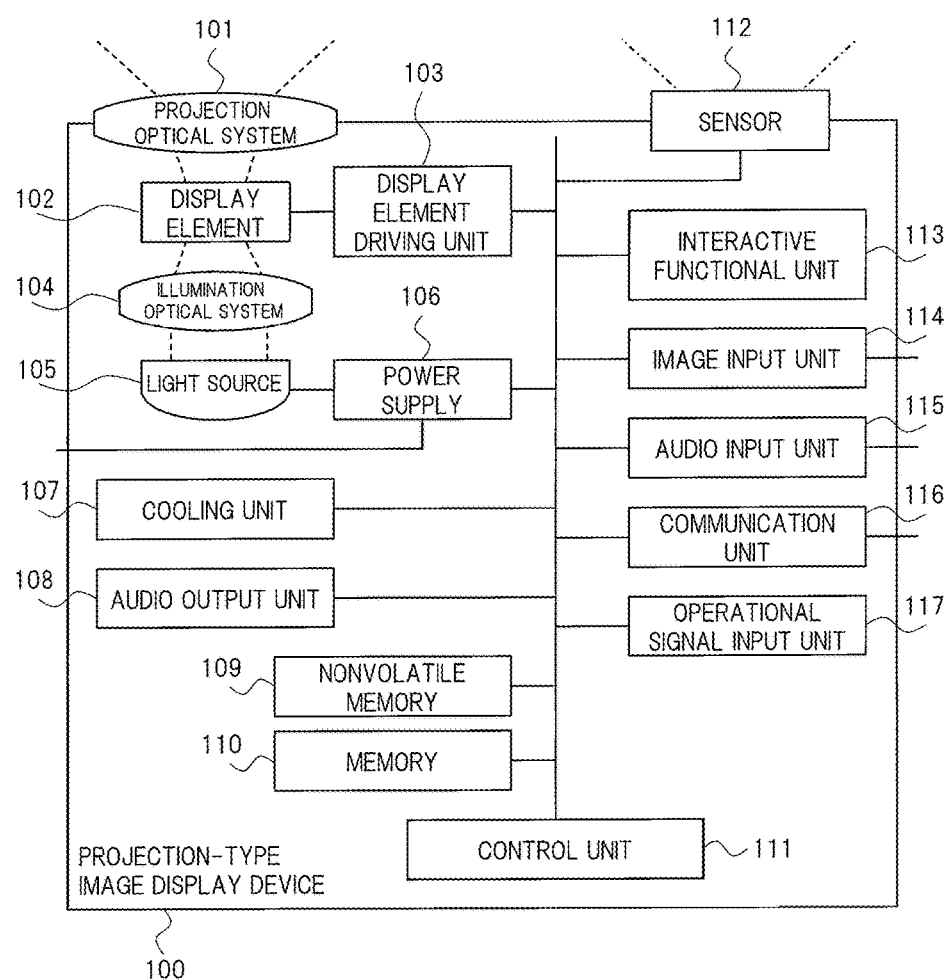
FIG. 2 is a diagram showing an outline of a configuration example of a projection-type image display device according to the first embodiment of the present invention.

FIG. 2 is a diagram showing an outline of a configuration example of the projection-type image display device 100 according to the present embodiment. The projection-type image display device 100 includes each unit such as a projection optical system 101, a display element 102, a display element driving unit 103, an illumination optical system 104, a light source 105, a power supply 106, a cooling unit 107, an audio output unit 108, a non-volatile memory 109, a memory 110, a control unit 111, a sensor 112, an interactive function unit 113, an image input unit 114, an audio input unit 115, a communication unit 116, and an operation signal input unit 117.

The projection optical system 101 is an optical system that projects an image onto the screen 10, and includes a lens and/or a mirror. The display element 102 is an element that generates an image to be projected, and, for example, a transmissive liquid crystal panel, a reflective liquid crystal panel, a DMD (Digital Micromirror Device: registered trademark) panel, etc., can be used. The display element driving unit 103 sends a drive signal corresponding to an image signal, to the display element 102, so that an image to be projected is generated. The illumination optical system 104 is an optical system that condenses illumination light generated by the light source 105 described later, and further uniforms and emits the condensed illumination light onto the display element 102. The light source 105 generates illumination light for image projection, and, for example, a high-pressure mercury lamp, a Xenon lamp, an LED (Light Emitting Diode) light source, a laser light source, etc., can be used.

The power supply 106 receives power supply from an external power source, and supplies an operating power to each unit including the light source 105. The cooling unit 107 is configured of a fan, etc., that releases heat generated by the light source 105 to the outside to suppress a temperature increase. The audio output unit 108 has a speaker, an external output terminal, etc., and outputs audio information related to the displayed image or outputs alert sound, warning sound, audio information, etc., related to an operation of the projection-type image display device 100, an error of the same, etc.

The non-volatile memory 109 is configured of a non-volatile memory such as a flash memory, and stores various pieces of operation data in the interactive function and data used for displayed icons, calibration, etc. The non-volatile memory 109 may store various pieces of setting information related to the projection-type image display device 100 or others. It may store image data (including a template image, etc.) used for projecting an image singularly by the projection-type image display device 100.

The memory 110 is configured of a volatile memory such as a DRAM (Dynamic Random Access Memory), and buffers data of an image that is a projection target and that is input via the image input unit 114 described later, etc., or loads and stores various pieces of control data related to the projection-type image display device 100.

The control unit 111 controls the operation of each unit of the projection-type image display device 100. Particularly in the present embodiment, the interactive function is achieved by controlling a sensor 112 and an interactive function unit 113 described later. The sensor 112 is a camera that captures an image of a front surface of the screen 10, and can detect reflection light caused when light is emitted from the light emitting pen 30 onto the screen 10, by detecting an infrared-light component (non-visible light component). When a cut wavelength of an optical filter is set to a visible light wavelength band (set to, for example, middle of a red visible light wavelength band), note that a part (that is, a projected image on the display screen 20) of the visible light components different from the infrared-light component can be also captured together with the infrared-light component. The sensor 112 may be configured so as to be attachable to the main body of the projection-type image display device 100 if needed.

The interactive function unit 113 achieves a function of an interactive action such as writing of a letter, a figure, etc., into the image region 21 by the user operating the light emitting pen 30. As a basic function, an infrared-light image acquired from the sensor 112 is analyzed, and the position of the reflection light caused when the light emitting pen 30 emits light onto the screen 10 is recognized, so that a position of the light emitting pen 30 on the screen 10, that is, a position at which the user has operated the light emitting pen 30 is calculated. Further, in the present embodiment, as described later, a shape of or a pattern of the reflection light caused when the light emitting pen 30 emits light onto the screen 10 is recognized, that is, a content of the light emitting pattern 35 shown in FIG. 1 is recognized, so that the attributes such as the color and the thickness of the drawn line can be switched in accordance with the light emitting pattern 35.

The interactive function unit 113 may have a function executing an application program, etc., that can be operated by the light emitting pen 30. For example, the interactive function unit 113 may have a function synthesizing the image region 21 and the operation icon region 22 and outputting the synthesized region. The interactive function unit 113 may also execute an application program performing a drawing process, etc., based on the user's operation of the light emitting pen 30 or an application program performing an operation for an image, etc., that is input from the image output device 200.

Further, the interactive function unit 113 may also have a function performing a calibration process such as positional correction and coordinates conversion between a region of an image (display screen 20) projected on the screen 10 by the projection optical system 101 and a range of the image capturing performed by the sensor 112. Note that the entire or a part of the functions of the interactive function unit 113 may be executed on the information processing device 300 side.

To the image input unit 114 and the audio input unit 115, image data and audio data that are a projection target and an output target are input from the image output device 200, etc., connected thereto via an external interface. The buffering of the input image data and audio data in the memory 110 may be achieved. The communication unit 116 has a function communicating with an external device such as the information processing device 300 so that various control signals, etc., are input/output. The operation signal input unit 117 is an input interface for performing an operation to the projection-type image display device 100, is configured of, for example, an operation button disposed on the main body of the projection-type image display device 100 or a light-receiving unit of a remote controller, and receives an incoming operation signal from the user.

FIG. 3 is diagrams each showing an outline of a configuration example of the light emitting pen 30 according to the present embodiment. FIG. 3(*a*) schematically shows an example of a structure of the light emitting pen 30. The light emitting pen 30 is a pen-shaped pointing tool as shown in the drawing, and has a configuration in which a three-dimensional light emitting pen head 32 is attached to a light emitting pen body 31. A head of the light emitting pen body 31 is provided with a light source 38, the light emitting pen head 32 is attached so as to cover the light source 38. The light source 38 is supplied with power from a battery that is not shown but placed inside the light emitting pen body 31, and emits non-visible light such as infrared light. In the present embodiment, note that the light emitting pen 30 is used as the pen-shaped pointing tool. However, the shape of the pointing tool is not limited to the pen shape, and can be any proper shape as long as the shape can be operated by the user.

FIG. 3(b) schematically shows an example of a structure of the light emitting pen head 32. A left drawing shows a top view and a perspective view of the light emitting pen head 32 when viewed from the head side. In this drawing example, the light emitting pen head 32 has a substantially dome shape. The light emitting pen head 32 is made of, for example, a resin such as plastic which transmits infrared light, and has a part which is subjected to such a filter process as blocking the infrared light, so that a light transmitting portion 33 and a light non-transmitting portion 34 as shown in the drawing are formed. The light emitting pen head 32 which has been subjected to the above-described filter process is attached to the light emitting pen body 31, so that the shape of the light emitting pattern 35 emitted onto the screen 10 can be a specific shape as shown in a right drawing when the infrared light is emitted.

In the light emitting pen 30, while it is desirable to emit the light from the light source 38 only when necessary for suppressing power consumption, a method of emitting the light is not particularly limited. For example, as shown in a left drawing of FIG. 3(c), in a normal condition, the light emitting pen head 32 is configured so as to be movable in an axial direction of the light emitting pen 30 while having a gap from the light emitting pen body 31. When the user pushes the light emitting pen 30 in a direction toward the light emitting pen head 32 while keeping the light emitting pen head 32 of the light emitting pen 30 in contact with the screen 10, the light emitting pen 30 can be configured so that the light emitting pen head 32 moves toward the light emitting pen body 31 to push a switch not shown, which results in a conduction state (ON state) to emit the light, as shown in a right drawing of FIG. 3(c).

When the user puts the light emitting pen head 32 away from the screen 10, a state of the light emitting pen head 32 is returned to the state shown in the left drawing of FIG. 3(c) by an elastic member such as a spring not shown, so that the switch turns off to stop emitting the light. The method of switching the light emitting pen 30 ON and OFF is not limited to this. For example, the light emission may be switched to ON and OFF by the user's operation of a switch disposed on the light emitting pen body 31.

In the present embodiment, the light emitting pen head 32 covering the light source 38 has a three-dimensional dome shape as shown in the drawing, and therefore, a light blocking pattern (filter portion) of the light non-transmitting portion 34 also has a three-dimensional shape. On the other hand, this light blocking pattern may be a plane pattern depending on how the light from the light source 38 spreads. (For example, the light emitting pen head 32 is made of a disc-shaped or cylindrical member).

The three-dimensional shape is not limited to the dome shape as described above, either. For example, such a polygonal pyramid shape, etc., as supporting the light blocking pattern of the light non-transmitting portion 34 may be applicable. (In this case, it is desirable to perform a smoothing process to a cut portion). The method of forming the light non-transmitting portion 34 is not particularly limited, either. For example, a method of pasting a film that does not transmit the infrared light, a method of applying a coating material, or other method may be properly adopted. The light non-transmitting portion 34 can be also formed through liquid crystal display using a transmissive liquid crystal panel or others.

FIG. 4 is a diagram showing an outline of an example of difference in the light emitting pattern 35 formed by light emitting pen head 32 according to the present embodiment. FIG. 4 shows the light emitting patterns 35 (light emitting patterns 35a, 35b, 35c) caused when the infrared light is emitted onto the screen 10 from three types of light emitting pens 30 (light emitting pens 30a, 30b, 30c) having light emitting pen heads 32 (light emitting pen heads 32a, 32b, 32c) having different light blocking patterns caused by the light non-transmitting portion 34.

The light emitting pen head 32a of the light emitting pen 30a has no light non-transmitting portion 34, and therefore the whole surface of the light emitting pen head 32a serves as the light transmitting portion 33. Such light blocking pattern and light emitting pen head 32a are also available. In this case, the light emitting pattern 35a is substantially circular. On the other hand, a light blocking pattern of the light emitting pen head 32b of the light emitting pen 30b substantially has such a shape as extending a light emission region in two directions as seen in the light emitting pattern 35b. Similarly, a light blocking pattern of the light emitting pen head 32c of the light emitting pen 30c substantially has such a shape as extending a light emission region in four directions as seen in a star shape of the light emitting pattern 35c.

By a method as described later, the interactive function unit 113 of the projection-type image display device 100 recognizes and identifies the position and the shape of each light emitting pattern 35 as shown in FIG. 4 from an infrared-light image captured by the sensor 12. A line, a figure, etc., can be drawn by further identification of the shape of the light emitting pattern 35, based on the attributes (line color, thickness, etc.) corresponding to the shape. In this case, directly separately using (changing to hold) the light emitting pens 30 (light emitting pens 30a, 30b, 30c in the example of FIG. 4) is enough for switching the attributes such as the line color and thickness, and therefore, this case can switch the corresponding attributes more quickly at a lower cost than, for example, the method of switching the corresponding attributes on a software basis using a pallet, etc., displayed on the operation icon region 22.

As described above, according to the image display system of the first embodiment of the present invention, the light emitting pen head 32 attached to the light emitting pen 30 has the light blocking pattern configured of the light transmitting portion 33 and the light non-transmitting portion 34, so that the light emitting pattern 35 on the screen 10 can be different for each light emitting pen 30 having each light emitting pen head 32 with a different light blocking pattern. The position and the shape of the light emitting pattern 35 are recognized and identified by the sensor 112 included in the projection-type image display device 100, so that the attributes such as the line color and thickness in drawing a line, a figure, etc., can be quickly switched by the interactive function.

Second Embodiment

In a second embodiment of the present invention, an example of a method of switching the light blocking pattern (i.e., light emitting pattern 35) of the light emitting pen head 32 of the light emitting pen 30 to a different pattern will be described. In the above-described first embodiment, the light blocking pattern is switched by preparing the plurality of light emitting pens 30 having the light emitting pen heads 32 with different light blocking patterns (light emitting pattern 35) as shown in FIGS. 1 and 4 and separately using (changing to hold) these light emitting pens 30. On the other hand, in the present embodiment, a plurality of light blocking patterns (light emitting pattern 35) can be switched by a single light emitting pen 30.

FIG. 5 is diagrams each showing an outline of an example of a method of switching the light blocking patterns of the light emitting pen head 32 according to the present embodiment. FIG. 5(a) schematically shows an example of switching the light blocking pattern by detaching the light emitting pen head 32a from the light emitting pen body 31 and replacing the head with the light emitting pen head 32b having a different light blocking pattern. In the present embodiment, the light emitting pen head 32 of the light emitting pen 30 is made of a material having elasticity such as resin, is assumed to be easily attachable to the light emitting pen body 31 through a fitting structure or others, and can be easily changed to and replaced with a light emitting pen head 32 having a different light blocking pattern.

FIG. 5(b) schematically shows an example of switching the light blocking patterns by a light emitting pen head 32f using a light emitting pen head 32d and a light emitting pen head 32e smaller than the light emitting pen head 32d so that the light emitting pen head 32d overlaps so as to cover the light emitting pen head 32e. In the light emitting pen head 32f, the outer light emitting pen head 32d is configured so as to be circumferentially rotatable relative to the light emitting pen head 32e. Therefore, when the user rotates the light emitting pen head 32d, the overall light blocking pattern of the light emitting pen head 32f can be switched depending on how the respective light blocking patterns of the light emitting pen head 32d and light emitting pen head 32e overlap with each other. In this case, it is desirable to provide such a stopper mechanism not shown (for example, stoppage by fitting of a protrusion to a trench or others) as stopping the rotation of the light emitting pen head 32d at a position at which the overall light blocking pattern of the light emitting pen head 32f takes a proper shape.

FIG. 5(c) schematically shows an example of switching the light blocking pattern of the light emitting pen head 32 by user's knocking of a knock portion 36 provided to the light emitting pen body 31. An upper drawing shows a state in which the light emitting pen head 32 having no light non-transmitting portion 34 is attached to the light emitting pen body 31 while a light blocking portion 37, which is a cylindrical member having a light non-transmitting portion corresponding to the light blocking pattern, is housed in the light emitting pen body 31. The light emitting pen body 31 is provided with the knock portion 36 as similar to that of, for example, an ordinary knock-type ballpoint pen or others. When the user performs an operation of knocking this, the light blocking portion 37 is pushed so as to be in mechanically cooperation with movement of the knock portion 36, and is moved to inside (or outside) of the light emitting pen head 32, so that the light non-transmitting portion 34 is formed in the light emitting pen head 32.

The method of forming the light non-transmitting portion 34 by moving the light blocking portion 37 which is independent of the light emitting pen head 32 is not limited to the knock operation method using the knock portion 36 as described above, and various methods can be properly adopted. For example, a mechanism may be provided, the mechanism moving the light blocking portion 37 by power which is mechanically or electrically/magnetically obtained by the user's operation of any movable or operating portion such as a rotary portion configured so that a part of the light emitting pen body 31 is rotatable around an axis of the light emitting pen body 31 or such as a switch.

And, for example, a plurality of light blocking portions 37 having different patterns may be sequentially cyclically switched and adopted for each repeat of the user's operation such as every time the user repeats the knocking of the knock portion 36 a plurality of times. The light emitting pen head 32 described here is not limited to a light emitting pen head whose entire surface is formed of the light transmitting portion 33 without the light non-transmitting portion 34 as shown in the drawing, and may be a light emitting pen head having such a light non-transmitting portion 34 as forming a specific light blocking pattern when overlapping on the light blocking pattern of the light blocking portion 37.

The methods of switching the light blocking pattern of the light emitting pen head 32 shown in FIGS. 5(a) to 5(c) are merely an example, the switching method is not limited to these methods, and other methods can be also obviously properly adopted. The methods can also include, for example, as described above, a method of dynamically changing the presence/absence, the shape, etc., of the light non-transmitting portion 34 using the transmissive liquid crystal panel, etc., provided on the light emitting pen head 32. Usage of not only one method but also a proper combination of a plurality of methods is also obviously possible.

As described above, according to the image display system of the second embodiment of the present invention, the overall light blocking pattern of the light emitting pen head 32 can be dynamically changed while using the same light emitting pen 30. For example, a method of replacing the light emitting pen head 32 which is configured to be detachable with a light emitting pen head 32 having a different light blocking pattern may be adopted, and a method of changing the light blocking pattern by operating a structurally movable portion of the light emitting pen head 32 may also be adopted. And, a method of forming a light blocking pattern on the light emitting pen head 32 by moving the light blocking portion 37 independent of the light emitting pen head 32 through a mechanism provided on the light emitting pen body 31 can be also adopted.

Third Embodiment

In a third embodiment of the present invention, explanation will be made about an example of a method of recognizing/identifying a difference in a shape, etc., between the light emitting patterns 35 each emitted from the light emitting pen 30 onto the screen 10. The interactive function unit 113 of the projection-type image display device 100 recognizes/identifies a difference in details between the light emitting patterns 35, so that the attributes (line color, thickness, etc.) corresponding to the pattern details can be automatically made when a line, a figure, etc., are drawn.

FIG. 6 is diagrams each showing an example of a method of identifying the light emitting pattern 35 according to the present embodiment. FIG. 6(a) shows an example of recognizing/identifying the difference between the light emitting patterns 35 from a difference in the number of protrusions of the shape of the light emitting pattern 35 (that is the number of extension directions of the emission regions and is indicated by dotted lines in light emitting patterns 35e and 35f) to be calculated. A light emitting pattern 35d of a light emitting pen 30d is circular. This is a case of the light emitting pen head 32 without the light non-transmitting portion 34 (light blocking pattern). In this case, a condition of "the number of protrusions=zero" can be used. A light emitting pattern 35e of a light emitting pen 30e appears in a case of a condition of "the number of protrusions=4", and a light emitting pattern 35f of a light emitting pen 30f appears in a case of a condition of "the number of protrusions=6".

As a method of calculating the number of protrusions, the number of protrusions can be calculated by, for example, identifying a part having the highest luminance of infrared light in a region where the light emitting pattern 35 is emitted (the part usually corresponds to a part at which the light emitting pen head 32 of the light emitting pen 30 is in contact with the screen 10), scanning a predetermined radial circumference around the part, and acquiring a luminance distribution on the circumference, based on the number of distribution regions where the luminance is higher than a predetermined threshold.

FIG. 6(b) shows an example of recognizing/identifying the difference between the light emitting patterns 35 from a difference in an area of the light emitting pattern 35. In the three types of the light emitting patterns 35d, 35e, and 35f as similar to those in FIG. 6(a), each size of the areas is expressed as "light emitting pattern 35d>light emitting pattern 35e>light emitting pattern 35f". In this case, the difference between these light emitting patterns 35 may be determined depending on, for example, which one of a plurality of sections or ranges an absolute value of a calculated area belongs to, or the light emitting patterns 35 maybe determined to be different from each other when a difference in an area value between these light emitting patterns 35 is equal to or larger than a predetermined threshold.

In both of the above-described methods, the light emitting patterns 35 emitted on the same screen 10 are recognized/identified, and the methods are on the assumption that a distance between the screen 10 and the projection-type image display device 100 (projector) is constant during usage of the interactive function by the user. A value of a positional relation in the distance and inclination between the screen 10 and the projection-type image display device 100 may be, for example, measured at execution of a calibration process, and be stored into and be properly referred to from the memory 110.

When the user brings the light emitting pen 30 into contact with the screen 10 and draws a line, a figure, etc., a part of the light emitting pattern 35 may be hidden by the user's arm, hand, or others depending on a position or a height of the light emitting pen 30 or depending on how the user holds the light emitting pen 30 or others, when the sensor 112 captures an image of the screen 10 to detect the infrared-light component, and therefore, a correct value for calculating the number of protrusions or the area cannot be obtained. In consideration of such a case, for example, even when the number of protrusions is calculated as "the number of protrusions=3" which results from a fact that one protrusion of the light emitting pattern 35e of FIG. 6(a) is hidden, the interactive function unit 113 is configured so that the light emitting pattern 35e can be corrected and recognized as a light emitting pattern 35e with "the number of protrusions=4". In order to achieve this configuration, it is desirable to set, for example, the light blocking patterns of the light emitting pen heads 32 so that the respective numbers of protrusions of the light emitting patterns 35 are not so close to each other. The same goes for the area of the light emitting pattern 35.

As described above, according to the image display system of the third embodiment of the present invention, the plurality of light emitting patterns 35 can be recognized and identified based on the number of protrusions of the shape of the light emitting pattern 35 and the area (area ratio) of the same. As a result, the attribute in the drawing of a line, a figure, etc., can be automatically set to each light emitting pattern 35.

Fourth Embodiment

In a fourth embodiment of the present invention, explanation will be made about an example of a method of setting/assigning the attribute in the drawing of a line, a figure, etc., to each of the identified light emitting patterns 35.

FIG. 7 is diagrams each showing an outline of an example of setting the attribute in the drawing of a line or a figure for the light emitting pattern 35 according to the present embodiment. FIG. 7(a) shows an example in which a color of the line in the drawing is previously fixedly assigned to each light emitting pattern 35. The example of FIG. 7(a) shows a case in which, for example, "black" is assigned to a circular light emitting pattern 35g while "red" is assigned to a light emitting pattern 35h whose emission area shape extends in two directions. When the light emitting pen 30g having the light emitting pattern 35g is moved along the surface of the screen 10, the interactive function unit 113 draws a trace of the movement of the light emitting pen 30 with a "black" line. In the case of the light emitting pen 30h having the light emitting pattern 35h, it draws a trace of the movement with a "red" line.

FIG. 7(b) shows an example in which the attribute in the drawing is dynamically assigned to each light emitting pattern 35 by using a pallet provided on a software basis. The example of FIG. 7(b) shows that, for example, it is previously recognized that two types of light emitting patterns 35g and 35h are used, and shows that the assignment of the attribute in the drawing to each of the light emitting patterns is not fixedly set (FIG. 7(b) shows the attributes as "attribute A" and "attribute B". A default attribute may be set.) This shows that the user dynamically assigns the attribute to each light emitting pattern 35 by using the pallet displayed on a software basis in the operation icon region 22, etc., in usage.

In this case, for example, a "blue/thick" section in the pallet displayed on the screen 10 is touched by the light emitting pen 30g having the light emitting pattern 35g, so that an attribute of "blue/thick line" is dynamically set to the light emitting pattern 35g. In this setting condition, when the light emitting pen 30g is moved along the surface of the screen 10, the interactive function unit 113 draws a trace of the movement with a "blue" "thick" line. If an attribute of "red/thin line" is already assigned to the light emitting pattern 35h, a trace of movement of the light emitting pen 30h having the light emitting pattern 35h is drawn with a "red" "thin" line.

Depending on the function of the software that provides the pallet, a variety of attributes that are not only the line color, thickness, etc., but also a line type such as a dotted line and a chain line can be set, or an "eraser" mode for erasing an already-drawn object can be set as the attribute in the drawing. Also in the fixed attribute assignment as shown in FIG. 7(a), the attributes that are not only the line color, thickness, etc., but also the line type, the "eraser" mode, others can be also obviously previously assigned.

As described above, according to the image display system of the fourth embodiment of the present invention, the system can be flexibly configured by properly adopting the method of previously fixedly assigning the attribute in the drawing to each light emitting pattern 35 or the method of dynamically setting/changing the assignment of the attribute by using the pallet that is achieved on a software basis.

Fifth Embodiment

According to a fifth embodiment of the present invention, both ends of the light emitting pen 30 have light emitting pen heads 32 having different light blocking patterns from each other, respectively. In this manner, the attributes can be separately used by a single light emitting pen 30.

FIG. 8 is diagrams each showing an outline of an example of a configuration of the light emitting pen 30 and an example of the drawing of the line or the figure according to the present embodiment. FIG. 8(a) shows an example of the structure of the light emitting pen 30 whose both ends have the light emitting pen heads 32a and 32b, respectively. As a method of attaching each light emitting pen head 32, the method described in each embodiment described above can be properly adopted. A different attachment method may be used for each of the both ends. The example of FIG. 8 is on the assumption that an attribute in drawing of a normal line, figure, etc., is assigned to the light emitting pattern 35 of the light emitting pen head 32b having the light non-transmitting portion 34 (light blocking pattern) while the "eraser" mode is assigned to the light emitting pattern 35 of the light emitting pen head 32a that is on the other end having no light blocking pattern.

FIG. 8(b) shows an example of the drawing performed by separately using two light emitting pen heads 32 of the light emitting pen 30. In a case of drawing using the light emitting pen head 32b on one end having the light blocking pattern as shown on the left of the screen 10, the normal line is drawn. On the other hand, in a case of drawing using the light emitting pen head 32a on the other end having no light blocking pattern by inverting the light emitting pen 30 upside down as shown on the right of the screen 10, the light emitting pen head 32a functions as an "eraser" that erases an already-drawn object.

As described above, according to the image display system of the fifth embodiment of the present invention, the light emitting pen heads 32 having different light blocking patterns from each other are provided to both ends of the light emitting pen 30, respectively, and, for example, the "eraser" mode is assigned to the light emitting pattern 35 of the light emitting pen head 32a on one end. In this manner, an object can be drawn and corrected through maneuvering feeling as similar to those of an actual pencil or mechanical pencil with an eraser.

Note that the drawing attributes assigned to the light emitting patterns 35 of the light emitting pen heads 32 on both ends are not limited to the case in which the "eraser" mode is assigned to one end as described above. On both ends, the line color, thickness, etc., may be switched, line types such as a continuous line and a dotted line may be switched, or these switching modes may be combined. Obviously, the dynamic attribute assignment using the pallet based on a software as shown in FIG. 7(b) described above can be also obviously changed.

In the light emitting pen 30 of each embodiment described above, a function of fixedly or dynamically displaying information in a form of a color, a figure, a text message, etc., may be provided to the light emitting pen body 31 so that the user easily recognizes the information indicating which drawing attribute is assigned to the light emitting pattern 35 of each light emitting pen head 32.

For example, in the case of the fixed attribute assignment to the light emitting pattern of the light emitting pen head 32, a color corresponding to the light emitting pen head 32 can be provided, or a line thickness corresponding thereto can be displayed. Also in the case of the dynamic attribute switching using the pallet, etc., on a software basis, a display unit or others that is provided to the light emitting pen body 31 but not shown can display the corresponding color or the corresponding text message. In the case of the display on the light emitting pen body 31, it is required to provide means making communication between the light emitting pen 30 and the projection-type image display device 100 or information processing device 300 through near-field wireless communication to acquire information of the assigned attribute or information related to contents to be displayed.

In the foregoing, the invention made by the present inventors has been concretely described based on the embodiments. However, it is needless to say that the present invention is not limited to the foregoing embodiments and various modifications and alterations can be made within the scope of the present invention. For example, the above-described embodiments have been explained in detail for easily understanding the present invention, but are not always limited to the one including all structures explained above. Also, a part of the structure of one embodiment can be replaced with the structure of another embodiment, and besides, the structure of another embodiment can be added to the structure of one embodiment. Further, another structure can be added to/eliminated from/replaced with a part of the structure of each embodiment.

EXPLANATION OF REFERENCE CHARACTERS

10 . . . screen
20 . . . display screen, 21 . . . image region, 22 . . . operation icon region, 23a and 23b . . . drawn figure,
30 and 30a to 30h . . . light emitting pen, 31 . . . light emitting pen body, 32 and 32a to 32f . . . light emitting pen head, 33 . . . light transmitting portion, 34 . . . light non-transmitting portion, 35 and 35a to 35h . . . light emitting pattern, 36 . . . knock portion, 37 . . . light blocking portion, 38 . . . light source,
100 . . . projection-type image display device, 101 . . . projection optical system, 102 . . . display element, 103 . . . display element driving unit, 104 . . . illumination optical system, 105 . . . light source, 106 . . . power supply, 107 . . . cooling unit, 108 . . . audio output unit, 109 . . . non-volatile memory, 110 . . . memory, 111 . . . control unit, 112 . . . sensor, 113 . . . interactive function unit, 114 . . . image input unit, 115 . . . audio input unit, 116 . . . communication unit, 117 . . . operation signal input unit,
200 . . . image output device,
300 . . . information processing device

The invention claimed is:
1. An image display system comprising:
a projection-type image display device which projects an image onto a screen; and
a pen-shaped pointing tool which is operated by a user,
wherein the pointing tool has a light emitting portion which emits non-visible light with a predetermined wavelength, and
the projection-type image display device has an interactive function unit which, from image data captured by a sensor performing image-capturing based on reflection light of the non-visible light with the predetermined wavelength reflected on the screen, recognizes a position of and a content of a light emitting pattern which is a shape of the non-visible light with the predetermined wavelength emitted from the pointing tool onto the screen, and executes process contents which are different from one another, based on the recognized position of and content of the light emitting pattern.

2. The image display system according to claim 1,
wherein the interactive function unit of the projection-type image display device draws a line or a figure on the screen based on a trace of the position of the light emitting pattern while using a drawing attribute corresponding to the content of the light emitting pattern.

3. The image display system according to claim 1,
wherein the pointing tool includes:
a body having the light emitting portion on a head of the body; and
a pen head which is a three-dimensional member attached to the head of the body so as to cover the light emitting portion,
the pen head includes a light blocking pattern corresponding to the light emitting pattern, the light blocking pattern being formed of a light transmitting portion which transmits the non-visible light with the predetermined wavelength and a light non-transmitting portion which blocks the non-visible light with the predetermined wavelength.

4. The image display system according to claim 3,
wherein the pen head of the pointing tool is detachable to the pointing tool so that a first pen head having a first light blocking pattern is replaceable with a second pen head having a second light blocking pattern different from the first light blocking pattern.

5. The image display system according to claim 3,
wherein the pen head of the pointing tool has a movable portion, and a second light blocking pattern different from a first light blocking pattern is formed from a state of the first light blocking pattern by movement of the movable portion.

6. The image display system according to claim 5,
wherein the movable portion of the pen head has a mechanism which stops the movement at a predetermined position at which the pen head forms the second light blocking pattern.

7. The image display system according to claim 3,
wherein the body of the pointing tool has an operating portion which is movable, and the pen head forms a second light blocking pattern different from a first light blocking pattern from a state in which the pen head has the first light blocking pattern by a user's operation of the operating portion.

8. The image display system according to claim 7,
wherein the pointing tool has a light blocking portion independent of the pen head, and the pen head forms the second light blocking pattern by movement of the light blocking portion caused by a user's operation of the operating portion.

9. The image display system according to claim 3,
wherein the pointing tool includes:
a first pen head having a first light emitting portion and a first light blocking pattern on one end of the body; and
a second pen head having a second light emitting portion and a second light blocking pattern on the other end of the body.

10. The image display system according to claim 9,
wherein the interactive function unit of the projection-type image display device erases a line or a figure which is already drawn on the screen based on a trace of the position of the light emitting pattern emitted onto the screen based on the second light blocking pattern by the pointing tool.

11. The image display system according to claim 1,
wherein the interactive function unit of the projection-type image display device executes processes which are different from one another depending on the number of protrusions of a shape of the recognized light emitting pattern.

12. The image display system according to claim 1,
wherein the interactive function unit of the projection-type image display device executes processes which are different from one another depending on an area of the recognized light emitting pattern.

13. The image display system according to claim 1,
wherein, when an operation is performed in a predetermined region on the screen through the pointing tool by a user, the interactive function unit of the projection-type image display device executes processes which are different from one another depending on a position at which the operation is performed in the predetermined region.

14. An image display system comprising:
a projection-type image display device which projects an image onto a screen;
a pen-shaped pointing tool which is operated by a user; and
an information processing device,
wherein the pointing tool has a light emitting portion which emits non-visible light with a predetermined wavelength,
to the information processing device, the projection-type image display device transmits image data captured by a sensor performing image-capturing based on reflection light of the non-visible light with the predetermined wavelength reflected on the screen, and
the information processing device has an interactive function unit which, based on the received image data, recognizes a position of and a content of a light emitting pattern which is a shape of the non-visible light with the predetermined wavelength emitted from the pointing tool onto the screen, and makes the projection-type image display device execute process contents which are different from one another, based on the recognized position of and content of the light emitting pattern.

* * * * *